(12) United States Patent
De Anna et al.

(10) Patent No.: US 7,443,109 B2
(45) Date of Patent: Oct. 28, 2008

(54) LED CURRENT PULSE LIMITER ARRANGEMENT

(75) Inventors: Paolo De Anna, Riese Pio X (IT); Ugo Francescutti, Ponzano Veneto (IT)

(73) Assignee: Patent-Treuhand-Gesellschaft für Elektrische Glühlampen mbH, München (DE)

( * ) Notice: Subject to any disclaimer, the term of this patent is extended or adjusted under 35 U.S.C. 154(b) by 326 days.

(21) Appl. No.: 11/204,055

(22) Filed: Aug. 16, 2005

(65) Prior Publication Data

US 2006/0043904 A1  Mar. 2, 2006

(30) Foreign Application Priority Data

Aug. 30, 2004 (EP) .................... 04425639

(51) Int. Cl.
*H05B 37/00* (2006.01)

(52) U.S. Cl. .................. 315/291; 315/244; 315/283

(58) Field of Classification Search ............... 315/289, 315/291, 200 R, 276, 283, 244; 323/355, 323/363
See application file for complete search history.

(56) References Cited

U.S. PATENT DOCUMENTS

| | | | | |
|---|---|---|---|---|
| 5,459,478 A | * | 10/1995 | Bolger et al. .................. 345/46 |
| 5,907,569 A | * | 5/1999 | Glance et al. .......... 372/29.021 |
| 6,040,663 A | * | 3/2000 | Bucks et al. ................. 315/291 |
| 6,388,393 B1 | * | 5/2002 | Illingworth ................. 315/291 |
| 6,826,059 B2 | * | 11/2004 | Bockle et al. .................. 363/17 |
| 2005/0151518 A1 | * | 7/2005 | Schneiker et al. ........... 323/222 |

FOREIGN PATENT DOCUMENTS

JP  62-209875  9/1987

* cited by examiner

*Primary Examiner*—David Hung Vu
(74) *Attorney, Agent, or Firm*—Carlo S. Bessone

(57) ABSTRACT

An arrangement for supplying a constant current to at least one LED includes a current source (2; 2a, 2b) with an output capacitor (3) connected across the terminals of the current source. An output inductor (4) is associated with the output capacitor (3) whereby the current supplied flows through the inductor (4). A smoothing resistor (5) is preferably connected in parallel to the output inductor (4).

13 Claims, 2 Drawing Sheets

LED CURRENT PULSE LIMITER ARRANGEMENT

FIELD OF THE INVENTION

The present invention relates to power supply arrangements for light emitting diodes (LEDs).

A problem frequently encountered in constant current LED systems lies in that "live" (or "hot swap") connection to the constant current power supply—i.e. connecting the LED(s) to the power supply after this has been energized may lead to LED junction failure. This is typically due to the large current pulse generated by the output capacitor of the power supply source, which is charged at the rated maximum open load voltage. This practically corresponds to a limited capability for the LED to withstand the maximum surge forward current likely to occur during live or hot swap connection of the LED to the power supply.

Additionally, possible low frequency PWM (Pulse Width Modulation) dimming of the LED generally poses heavy dynamic performance requirements on the driver. Under these circumstances, a cheap fly back topology cannot be used as the modulation bandwidth (BW) is limited by the high output capacitance required both to filter HF ripple and to withstand high ripple currents.

BACKGROUND ART

Prior art arrangements that aim at solving these problems are based on double stage conversion and/or the use of forward type converters (push pull, half bridge, and so on).

JP 62209875 discloses a light emitting diode driving circuit adapted to prevent a surge current from generating in a drain due to the application of a power to a source by connecting an inductance between a Zener diode connected with the source and the power source of the source. A diode connected in parallel with both ends of the inductance can contrarily prevent a surge voltage from being generated when the switch of the power source is opened.

In the applicant opinion JP 62209875 addresses the same technical problem to prevent a surge current of the present application, but using completely different technical solutions and in a completely different technical context.

The need is therefore felt for a simple, low-cost arrangement adapted to effectively overcome the disadvantages described in the foregoing.

OBJECT AND SUMMARY OF THE INVENTION

The object of the present invention is to properly satisfy that need.

According to the present invention, that object is achieved by means of an arrangements having the features set forth in the claims that follow, such claims being in all respects a part of the disclosure of this application.

In brief, the presently preferred embodiment of the invention uses an extra output inductor in parallel with a resistor at the output of the power supply. The ripple is thus filtered by the CL stage comprised of the output capacitor of the power supply and the added inductor. The capacitor can thus be selected with a capacitance value in the microFarad (uF) range (e.g. one to a few microFarads) in the place of the hundreds of microFarads range (i.e. one hundred to a few hundred microFarads). The small value of the output capacitor allows a large bandwidth and makes it possible to achieve a fast step response and design a good PWM dimming unit.

BRIEF DESCRIPTION OF THE DRAWINGS

The invention will now be described, by way of example only, with reference to the annexed figures of drawing, wherein.

DETAILED DESCRIPTION OF A PREFERRED EMBODIMENT OF THE INVENTION

Figure 1:
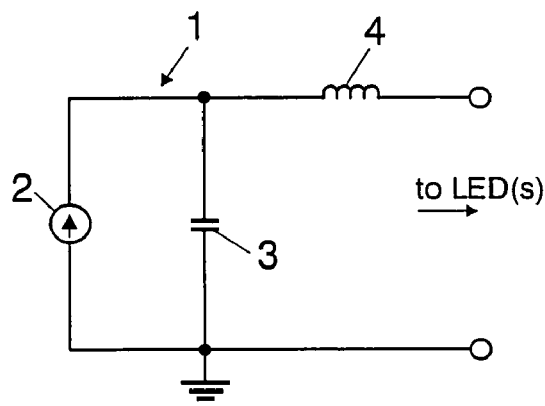
FIG. 1 is a schematic representation of the basic principle of the arrangement described herein.

In the schematic representation of FIG. 1 reference numeral 1 designates as a whole a power supply for use in supplying a constant current to one or more LEDs (not shown in FIG. 1). The source 1 is here represented as comprised of a constant current generator 2 having associated an output capacitor 3 connected across the output terminals of the generator 2. If no load is present at the output terminals, the output voltage of such a constant current power source will normally reach the maximum value allowed by the circuit (limited e.g. by standard size or by circuit topology).

If a low impedance load such as a LED or a set of LEDs) is directly connected to the output terminals of the power supply after energization thereof (i.e. "live" or "hot-swap" connection) a high current surge will flow therethrough.

The arrangement shown in FIG. 1 effectively counters this negative effect by means of an extra output inductor 4 located (preferably in parallel with a resistor 5—see FIG. 2) at the output of the power supply 1. Specifically, the inductor 4—that typically has an inductance value in the hundreds of microHenry range—is arranged in such a way to be traversed by the source current, i.e. the current produced by the generator 2 flows through the inductor 4. In other words, in the arrangement shown in FIG. 2 the output inductor 4 is associated with the output capacitor 3 so that the current is supplied to the LED (s) via the inductor 4.

The ripple possibly associated with the source current present on is thus filtered by the CL stage comprised of the output capacitor 3 of the power supply and the added inductor 4. The capacitor 3 can thus be selected with a capacitance value of about one to a few microFarads (in the place of the current value of hundreds of microFarads). The small value of the output capacitor 3 allows a large bandwidth and makes it possible to achieve a fast step response and design a good PWM dimming unit.

The arrangement shown in FIG. 1 (and FIG. 2) thus effectively solves the problem of limiting the occurrence of a current surge in the conditions described in the foregoing. Additionally, the arrangement in question solves other two typical problems related to constant current LED power supplies, namely:

achieving a good dynamic response with different input voltages and different number of LEDs connected to the output of the power supply; and dispensing with the need of having a high-capacitance smoothing electrolytic capacitor at the output of the power supply.

Figure 2:
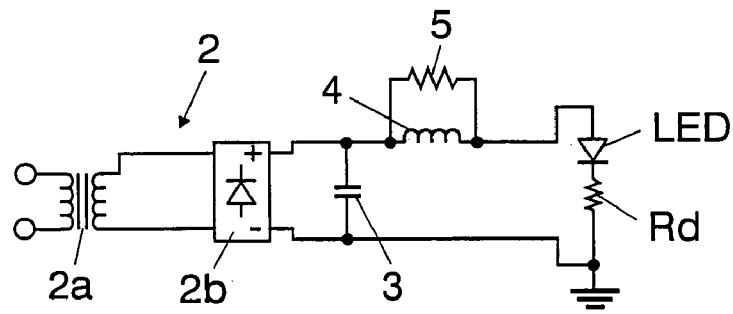
FIG. 2 is a more detailed representation of a preferred embodiment of the arrangement described herein.

More in detail, the diagram of FIG. 2 shows the current generator 2 of FIG. 1 as being in fact comprised of a transformer 2a whose secondary winding feeds a bridge rectifier 2b, with the capacitor 3 connected across the output terminals of the bridge rectifier 2b. In that way, the possibility exists of using at the output of a constant current power supply a C-L stage with a small capacitance value (one or a few uF) so that ceramic SMD (Surface Mounted Device) or a PTH (Pin Through Hole) capacitors can be used.

In prior art arrangements, the output capacitance had to be selected in order to:
- guarantee the required LED current ripple (ripple below a given threshold), and
- withstand the ripple current related to the power stage.

For instance, in a conventional flyback power stage the latter point above is the dominant factor. To meet this requirement, the capacitor must be usually chosen to be able support high ripple currents. For that reason a bulky, expensive electrolytic capacitor is currently used having a capacitance value of hundreds uF.

In the arrangement described herein a small ceramic capacitor is in a position to fulfil both requirements.

In the first place, the output inductor 4 acts as a smoothing filter so that a small ripple current can be achieved even when using a small capacitor for ripple filtering. Additionally, a ceramic capacitor can withstand high ripple current also with low capacitance values.

The arrangement described herein thus permits to use a small output capacitor 3 while at the same time achieving a small output current ripple because the output inductance 4 limits the current fluctuations.

At the same time small ceramic capacitors can well withstand even very high ripple currents.

Exemplary values for the output capacitor 3 and the inductance 4 are few microFarads (uF) and some hundreds microHenry (uH), respectively.

The arrangement of FIG. 2 is an improvement of the arrangement of FIG. 1 wherein a smoothing resistor 5 is connected in parallel to the output inductance 4. The resistor 5 (a typical value may be in 33 Ohm that is the tens of Ohms) range will dump the oscillation generated by the LC output stage.

Figure 3:
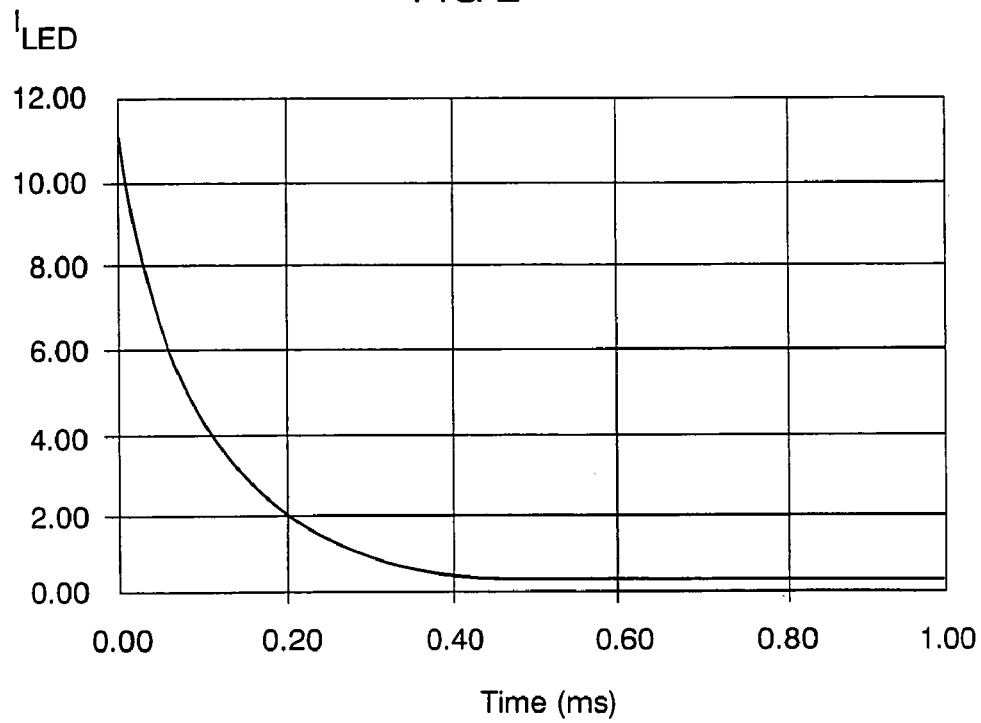
FIGS. 3 to 5 are three comparative time diagrams that highlight the advantages related to the use of the arrangement described herein.
Figure 4:
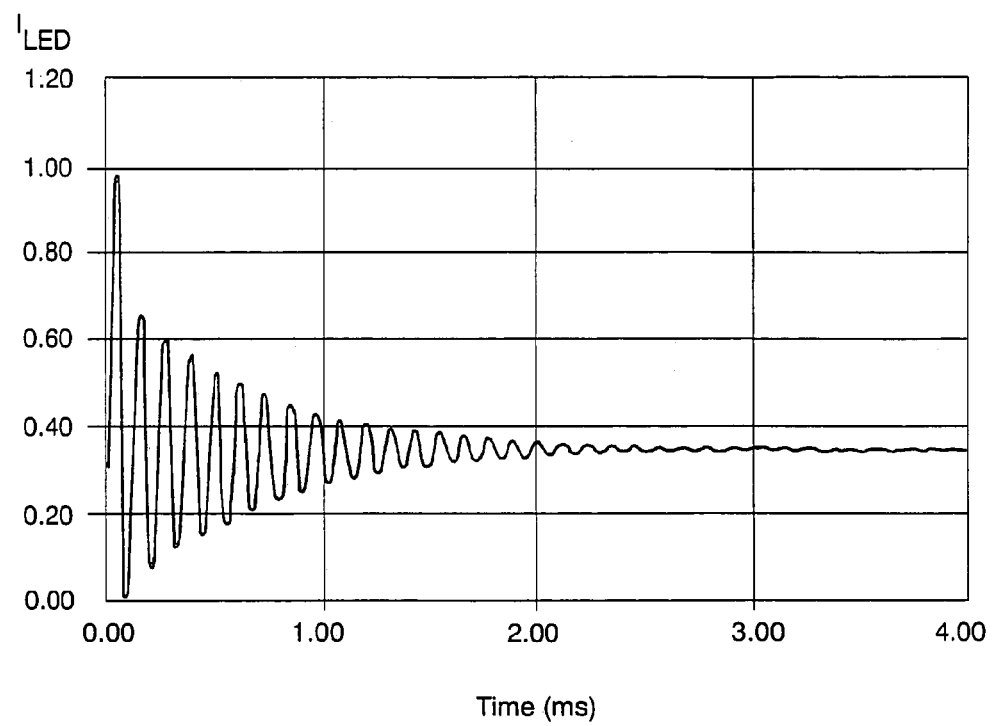
Figure 5:
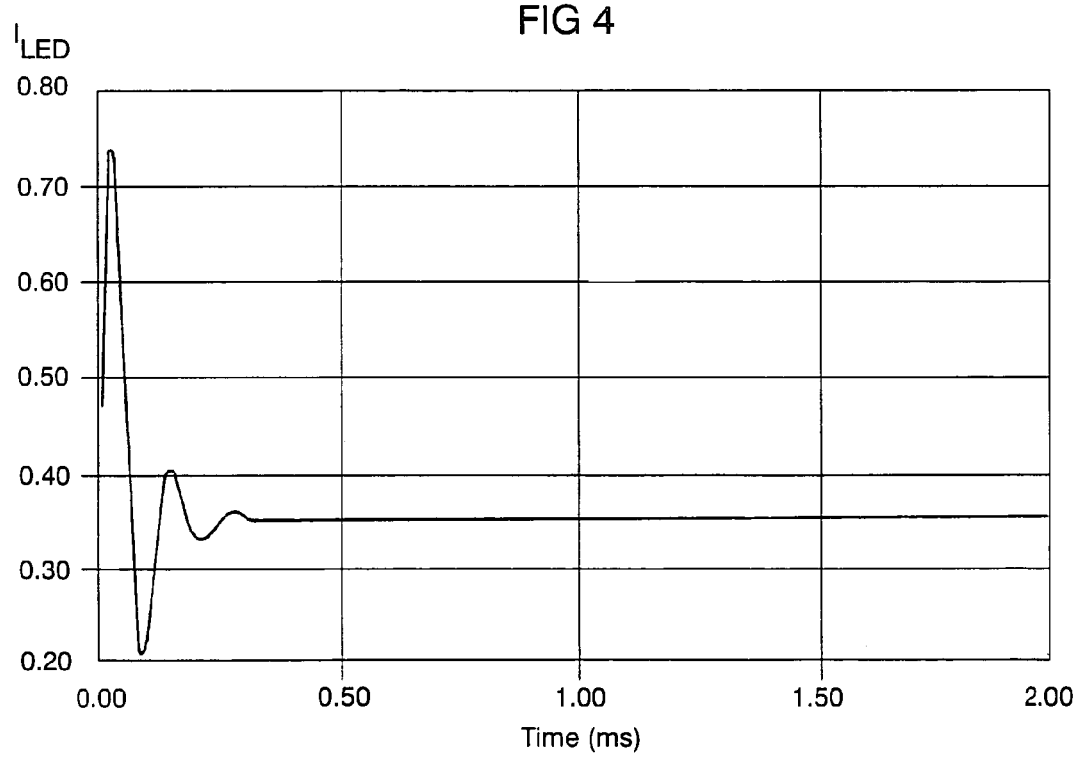

The diagrams of FIGS. 3 to 5 show typical behaviours over time (abscissa scale, in ms) of current pulses measured at the output of a constant current power supply during the live connection of LED modules with a constant current power supply (PS) limited to 25V open circuit voltage. The ordinate scales of all of the diagrams of FIGS. 3 to 5 are in A. All of the three diagrams refer to circuit arrangements where the DC generator 2 is a 0.35 A generator.

Specifically, the diagram of FIG. 3 refers to a conventional constant current power supply (no inductor 4—capacitor with a capacitance value of 100 uF).

The diagram of FIG. 4 refers to a constant current power supply equipped with an inductor 4 with an inductance value of 330 uH and a capacitor 3 having a capacitance value of 1 uF.

Finally, the diagram of FIG. 5 refers to a constant current power supply equipped with an inductor 4 with an inductance value of 330 uH, having a smoothing resistor 5 of 33 Ohm connected in parallel, plus a capacitor 3 having a capacitance value of 1 uF.

The arrangement described herein also improves the dynamic behaviour of the power supply. This is because a small output capacitance value between the constant current generator and the LED(s)—having an associated "dynamic" resistance Rd—reduces the delay in the feedback chain.

Moreover, the small output capacitance value pushes the RHP zero of the CCM (Right Half Plane Zero, Continuous Conduction Mode) flyback topology to a very high frequency value, thus facilitating loop stabilisation. More generally, the arrangement described leads to a simplification in the feedback loop network achieving a good transient response with different load and line conditions.

Those of skill in the art will promptly appreciate that the invention also applies to all switch mode power supply topologies and also to low frequency conventional transformers.

Consequently, without prejudice to the underlying principles of the invention, the details and the embodiments may vary, also significantly, with respect to what has been described and shown merely by way of example, without departing from the scope of the invention as defined by the annexed claims.

The invention claimed is:

1. An arrangement for supplying a constant current to at least one LED, the arrangement comprising:
   a constant current generator for generating a constant current signal, said constant current generator having output terminals;
   an output capacitor connected across said output terminals; and
   an output inductor connected with the output capacitor, between said output capacitor and the at least one LED, wherein the constant current signal generated by the constant current generator is supplied to said at least one LED via said inductor.

2. The arrangement of claim 1, characterized in that said output capacitor and said output inductor define a CL filtering stage for ripple possibly associated with said current supplied to said at least one LED.

3. The arrangement of claim 1, further comprising a resistor connected in parallel to said output inductor.

4. The arrangement of claim 1, characterized in that said output capacitor has a capacitance value in the microfarad range.

5. The arrangement of claim 1, characterized in that said output capacitor is a ceramic capacitor.

6. The arrangement of claim 1, characterized in that said output capacitor is a surface mounted device (SMD) capacitor.

7. The arrangement of claim 1, characterized in that said output capacitor is a Pin Through Hole (PTH) ceramic capacitor.

8. The arrangement of claim 1, characterized in that said output inductor has an inductance value in the hundreds of micro Henry range.

9. The arrangement of claim 3, characterized in that said resistor has a resistance value in the range of tens of Ohms range.

10. The arrangement of claim 2, further comprising a resistor connected in parallel to said output inductor.

11. The arrangement of claim 2, characterized in that said output capacitor has a capacitance value in the microfarad range.

12. The arrangement of claim 3, characterized in that said output capacitor has a capacitance value in the microfarad range.

13. The arrangement of claim 10, characterized in that said output capacitor has a capacitance value in the microfarad range.

* * * * *